United States Patent [19]

Fukushima

[11] Patent Number: 5,726,820
[45] Date of Patent: Mar. 10, 1998

[54] APPARATUS FOR RECORDING OR ERASING IMAGE SIGNALS IN SEQUENCE

[75] Inventor: Nobuo Fukushima, Yokohama, Japan

[73] Assignee: Canon Kabushiki Kaisha, Tokyo, Japan

[21] Appl. No.: 747,747

[22] Filed: Nov. 12, 1996

Related U.S. Application Data

[63] Continuation of Ser. No. 527,382, Sep. 13, 1995, abandoned, which is a continuation of Ser. No. 380,327, Jan. 30, 1995, abandoned, which is a continuation of Ser. No. 103,161, Aug. 9, 1993, abandoned, which is a continuation of Ser. No. 870,215, Apr. 17, 1992, abandoned, which is a continuation of Ser. No. 546,766, Jul. 2, 1990, abandoned.

[30] Foreign Application Priority Data

Jul. 3, 1989 [JP] Japan .................... 1-171650
Jul. 3, 1989 [JP] Japan .................... 1-171653

[51] Int. Cl.⁶ .................................................. G06F 11/00
[52] U.S. Cl. .................................................. 360/66
[58] Field of Search ....................................... 368/66

[56] References Cited

PUBLICATIONS

"WordPerfect® Made Easy", Series 5 Edition by M.Mincberg p. 301.
*Running MS DOS* by Van Wolverton, Microsoft Press ©1989, pp. 332–339.
*IBM Getting Started With Disk Operating System Version 4.00* ©1988, pp. 40 and 53–73.

Primary Examiner—Vincent P. Canney
Attorney, Agent, or Firm—Fitzpatrick, Cella, Harper & Scinto

[57] ABSTRACT

Apparatus for reproducing or erasing video signals recorded on a recording medium includes a first circuit for reproducing an identification signal recorded on the recording medium which indicates a sequence of recording of the video signals on the recording medium. A second circuit reproduces or erases a plurality of image signals which correspond to a plurality of pictures in a sequence corresponding to the identification signal reproduced by the first circuit.

8 Claims, 4 Drawing Sheets

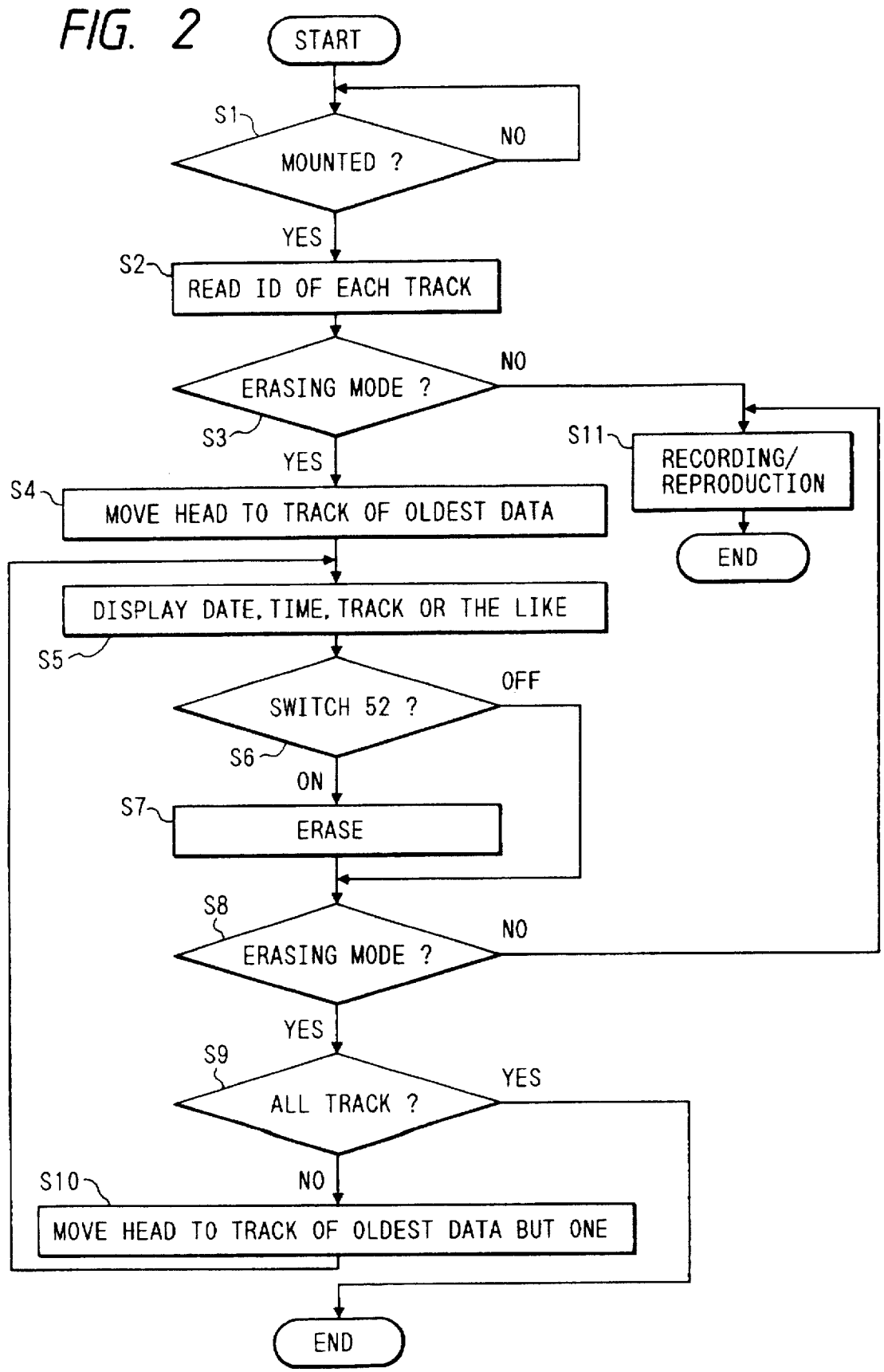

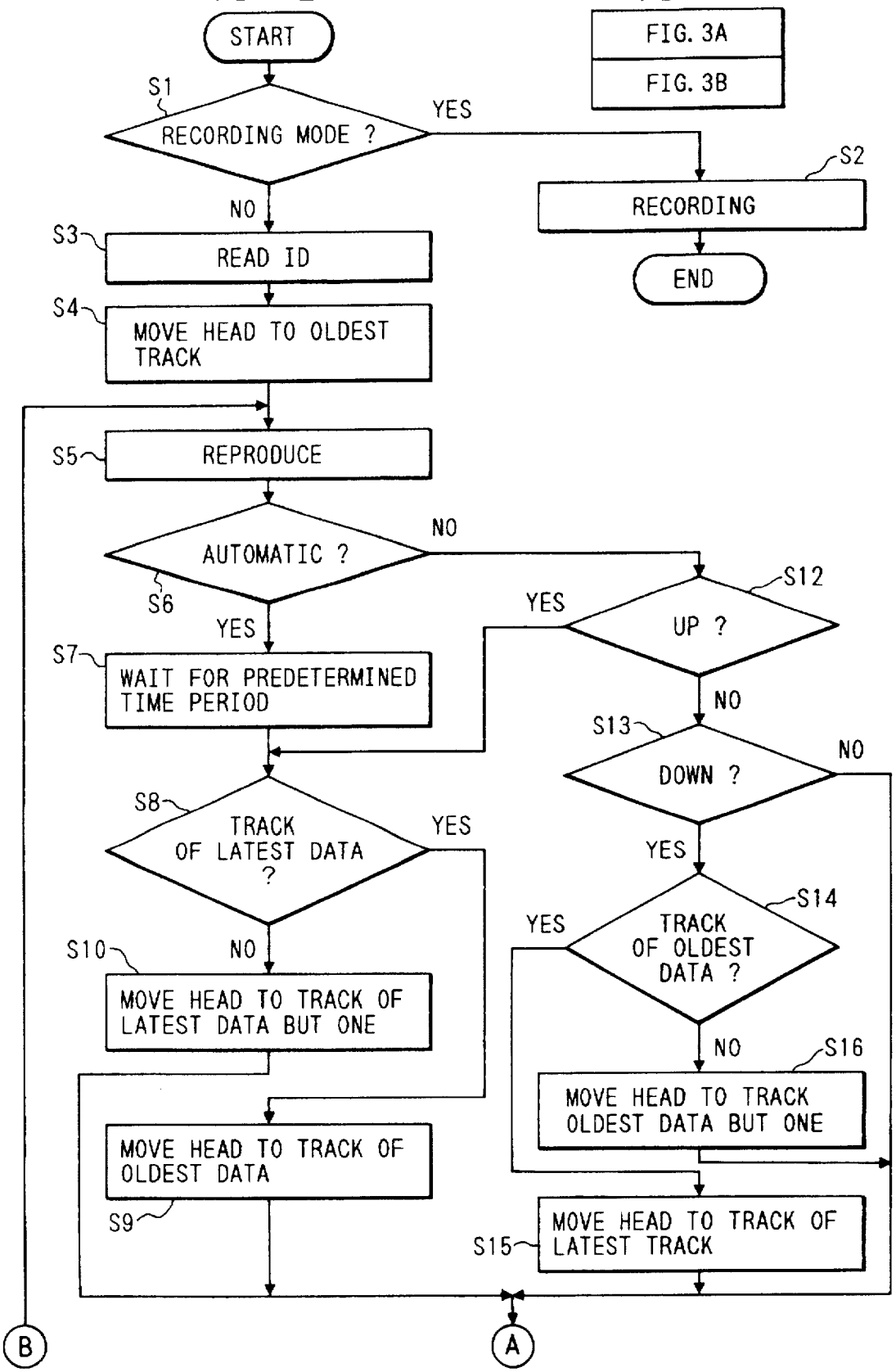

APPARATUS FOR RECORDING OR ERASING IMAGE SIGNALS IN SEQUENCE

This application is a continuation of application Ser. No. 08/527,382, filed Sep. 13, 1995, which is a continuation of application Ser. No. 08/380,327, filed Jan. 30, 1995, which is a continuation of application Ser. No. 08/103,161, filed Aug. 9, 1993, which is a continuation of application Ser. No. 07/870,215, filed Apr. 17, 1992, which is a continuation of application Ser. No. 07/546,766, filed Jul. 2, 1990, all now abandoned.

BACKGROUND OF THE INVENTION

1. Field of the Invention

This invention relates to apparatuses for reproduction and erasing and, more particularly, to an apparatus for reproducing and erasing designated contents recorded on a recording medium.

2. Related Background Art

A recording and reproducing apparatus used with a still video floppy disc as the recording medium (as prescribed in the Still Video Meeting), is provided with an erasing function for erasing unnecessary recorded contents. As an erasing procedure, there is one in which a magnetic head is moved to an intended track for erasing, and a signal in that track is erased by applying an erasing current to the head by operating an erasing switch, and another procedure in which signals in all tracks are erased sequentially from the outermost track to the innermost track by operating a predetermined switch.

An ordinary floppy disc has 50 tracks from the outermost 1-st track to the innermost 50-th track, and each track is capable of a recording one field of video signal. One frame of video is recorded by using two adjacent tracks. As identification data or ID data annexed to the still video image which has been recorded, there are prescribed such recording formats as date, time, track number, field/frame identification data and user's code.

In a such still video floppy disc, each track is capable of being independently ereased and recorded. Therefore, when erasing and recording are carried out repeatedly after carrying out an initial recording up to the 50-th track, non-recorded tracks are found distributed intermittently. In other words, video record contents are not always recorded in track number sequence.

With a prior art reproducing apparatus, tracks are retrieved sequentially from the 1-st track, for instance, and tracks with video records are reproduced. With a floppy disc, after erasing and recording with respect thereto have been carried out repeatedly, however, track-sequential reproduction does not always coincide with the sequence of recording. Therefore, sequential reproduction of records is extremely cumbersome.

The same problem is encountered in case of erasing, i.e., retrieval of video contents to be erased. For example, there sometimes occur cases when it is desired to rearrange floppy record contents by erasing old video records. With the prior art erasing apparatus, however, such operation can not be performed efficiently. In the prior art case, data is sequentially reproduced from the 1-st track, and the date of recording on each track is confirmed from date and time data of the ID data. If necessary, data is memorized using paper. After all the tracks have been retrieved, a track having the oldest recorded contents or recorded contents thought to be unnecessary is designated independently for erasing. This operation is extremely cumbersome and is liable to erroneous erasing of newly recorded video signal.

SUMMARY OF THE INVENTION

The present invention has been developed in the light of the above, and its object is to provide an apparatus for reproduction or erasing, which precludes the cumbersomeness discussed above.

Another object of the invention is to provide an erasing apparatus which permits automatic erasing of recorded video data in the same sequence as recording.

A further object of the invention is to provide an apparatus for reproduction or erasing, which is improved in the easiness of use.

To attain the above objects of the invention, there is provided an apparatus for reproducing or erasing signals recorded in each of the recording sections of a recording medium, which comprises identification data reproduction means for sequentially reproducing identification data recorded ndividual recording sections to identify recorded data therein, and control means for controlling the sequence of reproduction or erasing according to the identification data.

The above and other objects and features of the invention will become more apparent from the following description of embodiments and drawings.

BRIEF DESCRIPTION OF THE DRAWINGS

FIG. 2 is a flow chart for explaining the operation of the same embodiment; and

FIGS. 3, 3A and 3B are flow charts for explaining the operation of a second embodiment of the invention.

DETAILED DESCRIPTION OF THE PREFERRED EMBODIMENTS

Now, embodiments of the invention will be described with reference to the drawings.

Figure 1:
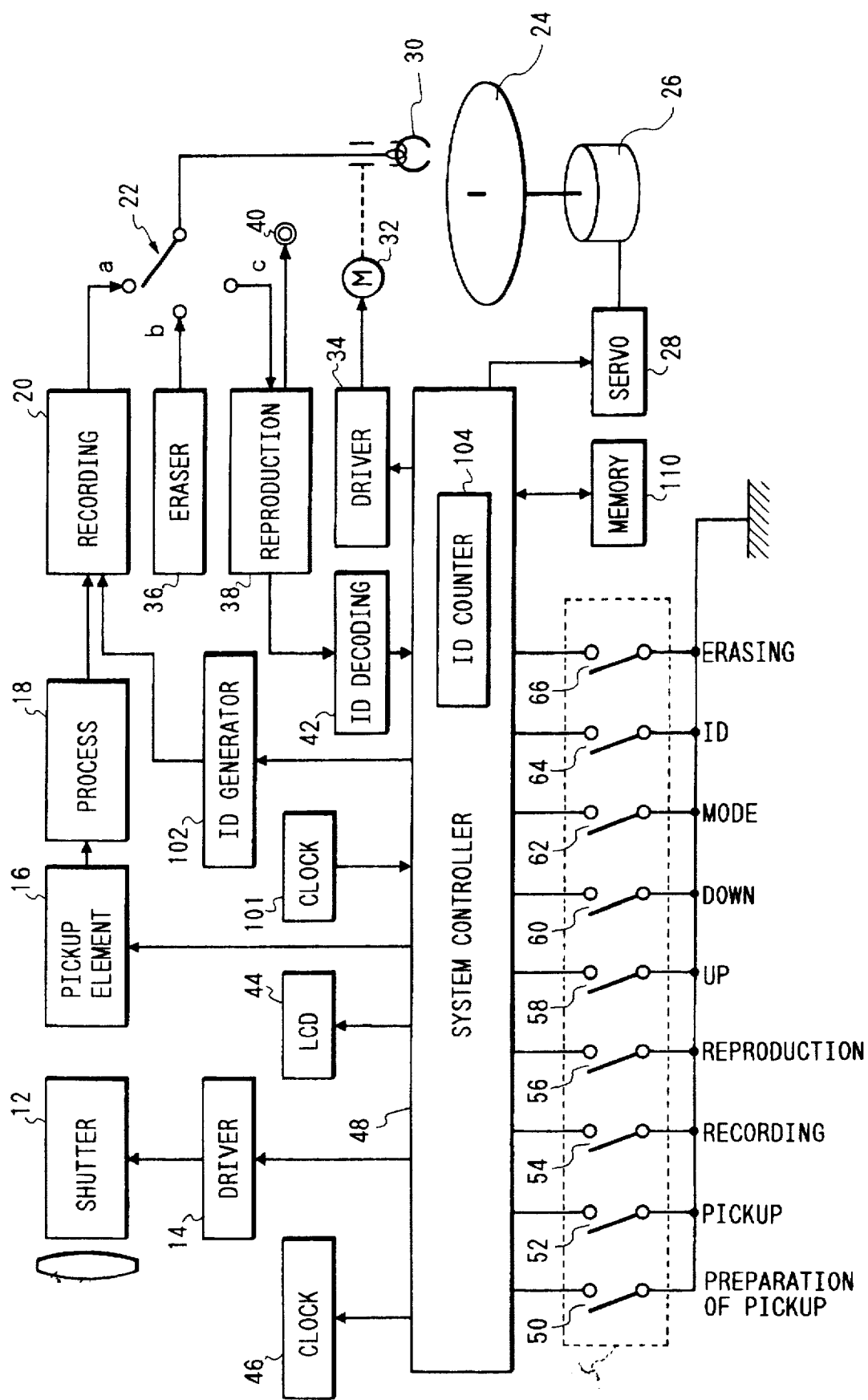
FIG. 1 is a block diagram representation of a first embodiment of the invention.

FIG. 1 is a block diagram representation of one embodiment of the invention. Reference numeral 10 designates a pick-up lens, 12 is a mechanical shutter, 14 is a driver circuit for driving shutter 12, 16 is a pickup element, 18 is a process circuit for forming a brightness signal and a color difference signal from the output of pickup element 16, 20 is a recording circuit for subjecting the brightness signal and color difference signal provided from process circuit 18 to recording processing such as modulation, 22 is a switch for switching between recording, erasing and reproduction, 24 is a video floppy discas recording medium, 26 is a motor for rotating floppy disc 24, 28 is a servo circuit for controlling the rotation of the motor, 30 is a magnetic head, 32 is a head drive motor for moving magnetic head 30 in the radial direction of floppy disc 24, 34 is a driver circuit for driving motor 32, 36 is an eraser circuit for generating an erasing signal, 38 is a reproduction circuit for subjecting a reproduced signal from magnetic head 30 to reproduction processing such as demodulation to produce a video signal, 40 is a video output terminal, and 42 is an ID decoding circuit for decoding an ID signal contained in the recorded signal recorded on floppy disc 24.

Reference numeral 44 designates a liquid crystal display unit for displaying the status of the system and various data, 46 is a clock generation circuit for generating operation reference clocks, and 48 is a system controller for controlling the entire system. Reference numeral 49 designates a switch unit for inputting predetermined instructions to system controller 48. Preparation-of-pickup switch 50 is closed to indicate the commencement of a preparation-of-pickup operation with a first stroke of a shutter release operation, and pickup switch 52 is closed to indicate a pickup operation with a second stroke of the shutter release operation. Other switches in the switch unit are recording switch 54, reproduction switch 56, up switch 58 for indicating track-up, down switch 60 for indicating track-down, mode switch 62 for switching the display mode of display 44 and also switching of a preset mode, ID setting switch 64 and erasing switch 66 for indicating an erasing mode.

Reference numeral 101 designates a clock calendar circuit for generating date and time data, and 102 is a modulating circuit for modulating, for instance, date and time data from clock circuit 101 as ID data by DPSK modulation. Reference numeral 104 designates a counter, which counts 4-digit serial number to be recorded as ID data and is incremented whenever a pickup is made.

The operation of the system shown in FIG. 1 will be described with reference to FIG. 2. In this embodiment, the command of erasing is given by using a shutter release operation. A shutter release operation in the erasing mode is regarded as a command of erasing, and in response to this operation, an erasing current is impressed from erasing circuit 36 to magnetic head 30.

When floppy disc 24 is mounted (step S1), magnetic head 30 is fed in the order of tracks to read out ID signals in all the tracks of mounted floppy disc 24 and store the date and time of ID of each track in memory (step S2). Then, a check is performed as to whether erasing switch 66 is "on", i.e., whether there is erasing mode (step S3). If there is not any erasing mode, a recording or reproducing operation is executed according to recording switch 54 or reproduction switch 56 (step S11). In the case of the erasing mode, the head is moved to the oldest track in date and time according to data stored in step S2 (step S4), and the date, time and track number of that track are displayed on display 44 (step S5). Then, pickup switch 54 is checked (step S6). If the switch is "on", erasing current is impressed on magnetic head 30 from erasing circuit 36 to erase the recorded signal in that track (step S7). If pickup switch 54 is "off", no signal is erased, and the routine goes to step S8.

Erasing switch 66 is checked (S8). If it is "off", it is regarded that the erasing mode is cancelled, and the routine goes to step S11. If the switch is "on", head 30 is fed up to the last track (step S9) and then to the next newest track (step S10). Step S5 and following steps are repeated. When the above operation is done for all tracks, the routine is ended.

In the case of FIG. 2 the confirmation of erasing is done in step S6, and erasing is effected if and only if switch 52 is "on". Conversely, it is possible to move the head to the next track without erasing any signal if switch 52 is "on" and effect erasing if switch 52 is "off". This method is more convenient in the case where there are many tracks to be erased.

In the above embodiment, date and time data are utilized for the sequence of tracks to be erased, but it is possible to use user's data instead. User's data are numerical data of several digits, and their figure is incremented by one whenever recording is done. As a further alternative, it is possible to move the head in the sequence of smaller data.

In the case of a floppy disc, on which data is recorded with a still video system without any ID recording function, it is impossible to obtain date and time data or user's data. For such a floppy disc, a check of whether there is ID data may be executed in step S2 in FIG. 2, and the routine may proceed to one for executing reproduction in the track sequence as in the prior art.

In this embodiment, the head is moved in the sequence of recording. Thus, even where old and new recorded data coexist, erasing can be reliably effected from older data, and the operability is greatly improved. In addition, the possibility of erroneously erasing newly recorded data is reduced. Further, recording may be executed wihtout taking care of the sequence on the tracks, and the operability of recording, reproduction and erasing is greatly improved.

As will be readily understood from the above description, according to the invention unnecessary data can be erased with a simple operation.

A different embodiment of the invention will now be described.

This embodiment is the same in construction as the previous embodiment shown in FIG. 1, but is different in operation.

Figure 3B:
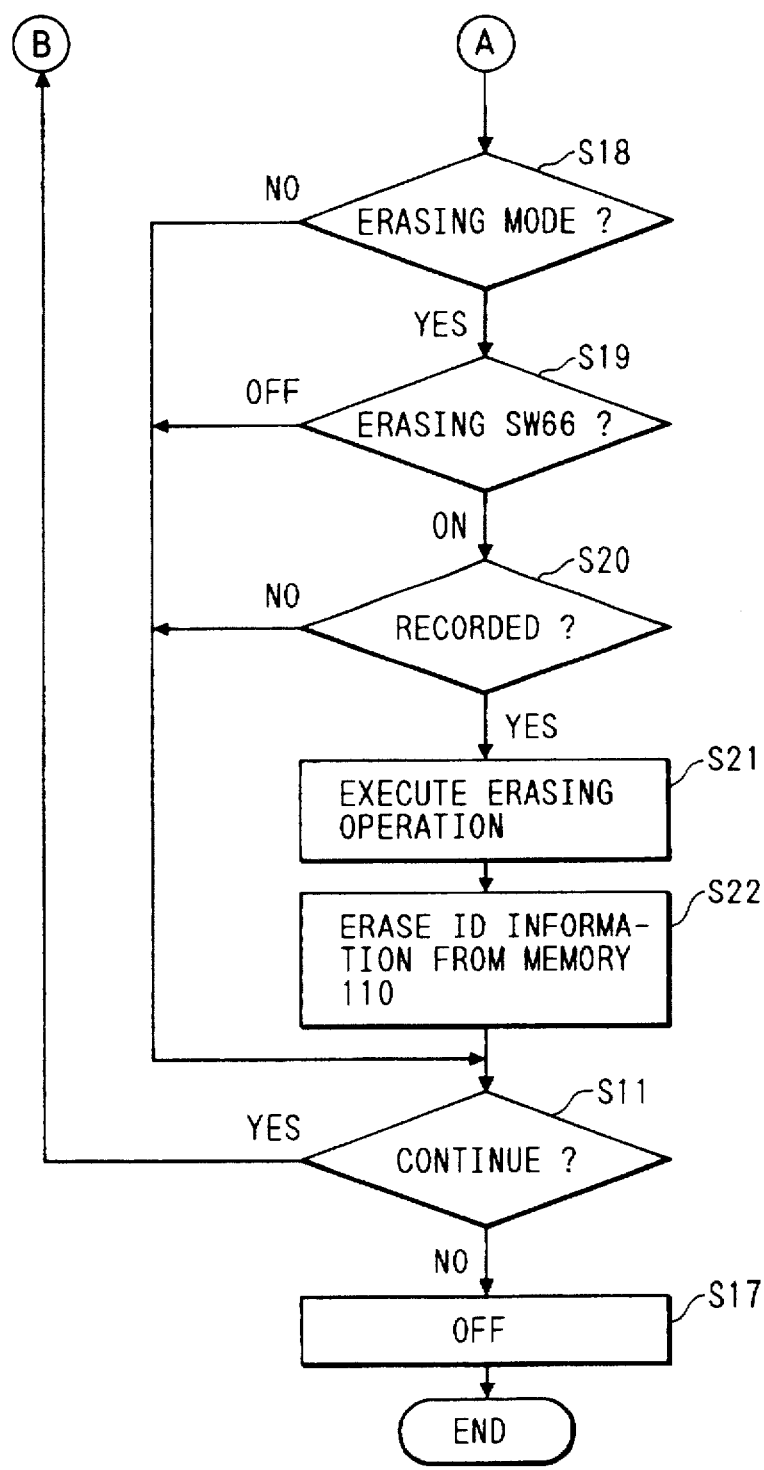

The operation of the embodiment will be described with reference to FIG. 3. The operation mode is first checked (as to whether the mode is a reproduction mode, a recording mode or an erasing mode) (step S1). In the case of the a recording mode, recording operation is executed (step S2). The recording operation is irrelevant to the embodiment, and therefore it is not described. In the case of the reproduction mode or erasing mode, magnetic head 30 is moved to successive tracks to read out ID signals in all tracks of the floppy and store the date and time of the ID of all tracks in memory area of memory 110. Memory 110 is provided with memory areas corresponding in number to the number of tracks of floppy disc 24 (which is 50 in this embodiment), and data as to whether each track is a recorded or a non-recorded track and also as to the date and time of recording are stored. The head then is moved to the oldest track in date and time according to stored data (step S4). Then, reproduction circuit 38 is operated to reproduce data from that track, and a reproduced video signal is provided from video output terminal 40 (step S5).

As a reproducing operation, there are an auto-reproduction mode, in which tracks with recorded signals are reproduced sequentially at a predetermined interval, and a manual reproduction mode, in which designated tracks are reproduced independently by manual operation. The mode is set by mode setting switch 62. The set mode is judged (step S6), and in the case of the auto-reprodutction mode, after waiting for a predetermined period of time (step S7), a check is done from data stored in step S3 as to whether the date and time data of the present track are newest among the data of all tracks (step S8). If the data are newest, the head is moved to the track of the oldest date and time data (step S9). If the data are not newest, the head is moved to the track of the next newest to the date and time data of the present track (step S10).

If the mode is not the auto-reproduction mode (step S6), up-switch 58 is checked (step S12). If the switch is "on", the head is moved to the track of the next newest date and time data (step S8), and the routine described above is executed. If up-switch 58 is "off", down-switch 60 is checked (step S13). If down-switch 60 is "on", a check is done from data stored in step S3 as to whether the data and time data of the present track are oldest among data of all tracks. If the data are oldest, the head is moved to the track of the newest date and time data (step S15). Otherwise, the head is moved to the track of the next oldest data to the date and time data of the present track (step S16).

After steps S9, S10, S13, S15 and S16, a check is made as to whether the mode is the erasing mode (step S18). If the mode is the erasing mode, erasing switch 66 is checked (step S19). If the switch is "on", a check is made as to whether recorded tracks are stored in memory 110 (step S20). If a recorded track is memorized, switch 22 is switched to be in contact, and an erasing current is impressed on magnetic head 30 to effect erasing of the record of this track in memory 110 (step S22). If none of the conditions of steps S18 to S20 is satisfied, no erasing operation is executed.

Now, a check is made as to whether the routine is continued, i.e., whether the reproduction mode or erasing mode is continued (step S11). The routine is stopped in a case when a battery is used as the power source and is worn out, in addition to the case when the recording mode is designated by operating switch unit 49. When the routine is continued, the routine goes back to step S5. Otherwise, the reproduction mode or erasing mode is turned off (step S17).

In the above embodiment, date and time data are used as references for judgement of the sequence of accessing of tracks not only in the case of erasing but also in the case of reproduction. However, it is possible to use user's data instead. User's data are numerical data of several digits, with the numerical figure incremented by one whenever recording is done. It is possible to effect reproduction from tracks of smaller data.

In the case of a floppy disc with data recorded using a still video apparatus without any ID recording function, it is impossible to obtain date and time data or user's data. With such a floppy disc, a check as to whether there is an ID may be done in step S3 in FIG. 3, and the routine of reproduction in track sequence may be executed as in the prior art.

In the above first and second embodiments, a still video floppy disc is used as the recording medium. However, it is possible to use a tape-like medium or an optical recording medium or a semiconductor memory or a like solid-state memory. Further, ID data may be those which are recorded in frequency multiplification with video signal or recorded on a time division basis without frequency multiplification. Further, it is possible to use recording data other than a video signal, for instance, an audio signal.

As has been described in the foregoing, according to the invention, a signal recorded on a recording medium can be reproduced in the time sequence of recording.

Thus, the recorded contents can be very readily confirmed not only in the case of reproduction but also in the case of erasing. Further, recording may be effected without regard to the sequence on the recording medium, and the operability of recording, reproduction and erasing is greatly improved.

I claim:

1. An apparatus for causing a head to reproduce or erase image signals recorded on a recording medium, comprising:

reproducing means for reading from the recording medium (i) a plurality of image signals and (ii) an identification signal for each of the image signals recorded on the recording medium;

control means for causing said reproducing means to sequentially reproduce or erase the recorded image signals from the recording medium in the recording order beginning at the oldest recorded image signal without selecting all of the image signals to be reproduced or erased; and erasing instruction means for providing an instruction for erasing the sequentially reproduced image signal.

2. The apparatus according to claim 1, wherein said identification signal is frequency multiplexed with said image signal.

3. The apparatus according to claim 1, wherein said identification signal indicates the date of recording of said image signal.

4. The apparatus according to claim 1, which further comprises:

(c) recording means for recording said image signal along with said identification signal on said medium.

5. The apparatus according to claim 4, which further comprises:

(d) photoelectric converting means for generating said image signal through photoelectric conversion of a subject image.

6. The apparatus according to claim 1, wherein the medium comprises a disk-like recording medium.

7. An apparatus for causing a head to reproduce or erase an image signal recorded in each recording section of a recording medium, comprising:

identification data reproducing means for sequentially reproducing identification data recorded in each said section for identifying recorded data in the corresponding section;

memory means for storing the reproduced identification data;

control means for causing said reproducing means to sequentially erase the recorded image signals from the recording medium in the recording order beginning at the oldest recorded image signal without selecting all of the image signals to be erased.

8. The apparatus according to claim 7, wherein said identification data is frequency multiplexed with said recorded data.

* * * * *

UNITED STATES PATENT AND TRADEMARK OFFICE
CERTIFICATE OF CORRECTION

PATENT NO. : 5,726,820
DATED : March 10, 1998
INVENTOR(S) : NOBUO FUKUSHIMA

It is certified that error appears in the above-identified patent and that said Letters Patent is hereby corrected as shown below:

Column 1

Line 34, "a" should be deleted, "video" should read --a video--.
Line 40, "a such" should read --such a--.
Line 41, "ereased" should read --erased--.

Column 2

Line 21, "ndividual" should read --individual--.
Line 53, "discas" should read --disc as--.

Column 3

Line 19, "counts" should read --counts a--.

Column 4

Line 11, "wihtout" should read --without--.
Line 15, "invention" should read --invention,--.
Line 26, "recording" should read --a recording--.
Line 32, "floppy" should read --floppy disc--.
Line 25, delete "a".

UNITED STATES PATENT AND TRADEMARK OFFICE
CERTIFICATE OF CORRECTION

PATENT NO. : 5,726,820
DATED : March 10, 1998
INVENTOR(S) : NOBUO FUKUSHIMA

It is certified that error appears in the above-identified patent and that said Letters Patent is hereby corrected as shown below:

<u>Column 6</u>

Line 24, "(c)" should be deleted.
    Line 29, "(d)" should be deleted.

Signed and Sealed this

Eighth Day of December, 1998

Attest:

BRUCE LEHMAN

*Attesting Officer*    *Commissioner of Patents and Trademarks*